April 26, 1966      W. W. CEASE      3,247,988
APPARATUS FOR SERVING PREVIOUSLY PREPARED FOOD
Filed Aug. 30, 1962      2 Sheets-Sheet 1
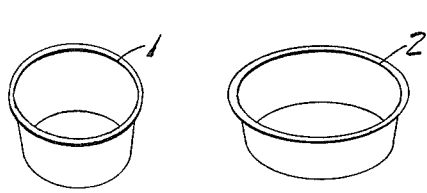
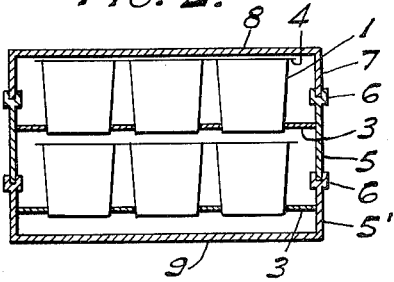
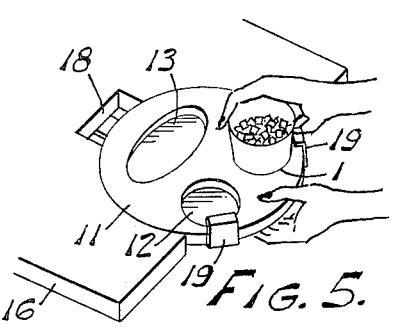
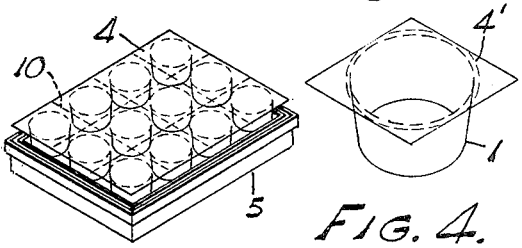
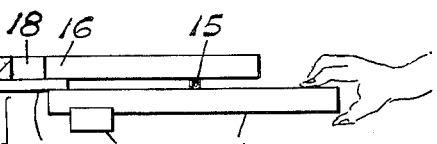
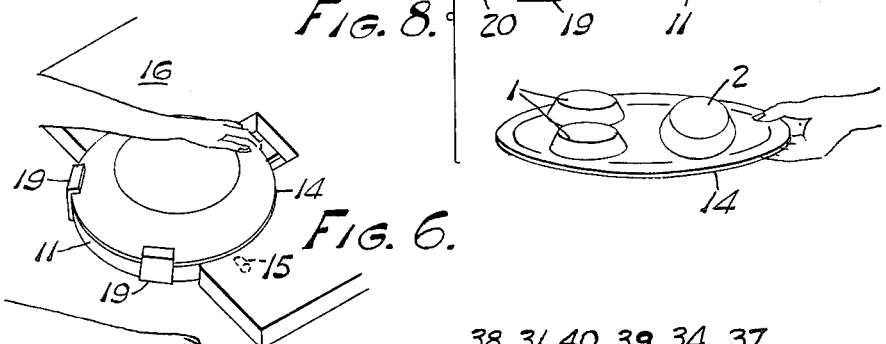
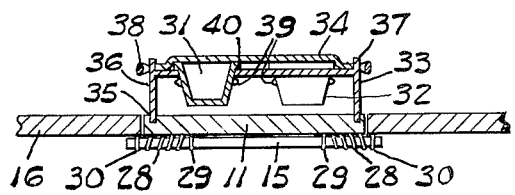
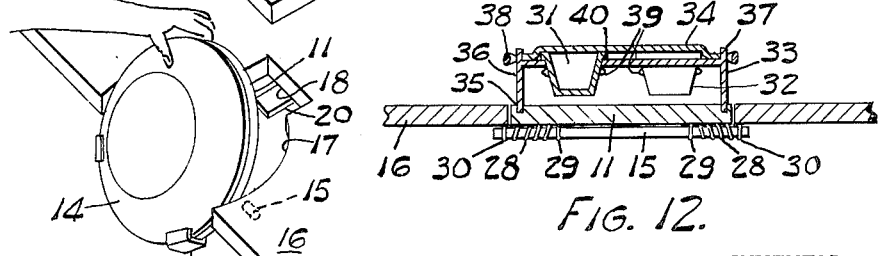
INVENTOR.
WILLIAM W. CEASE
BY
Christel & Bean
ATTORNEYS

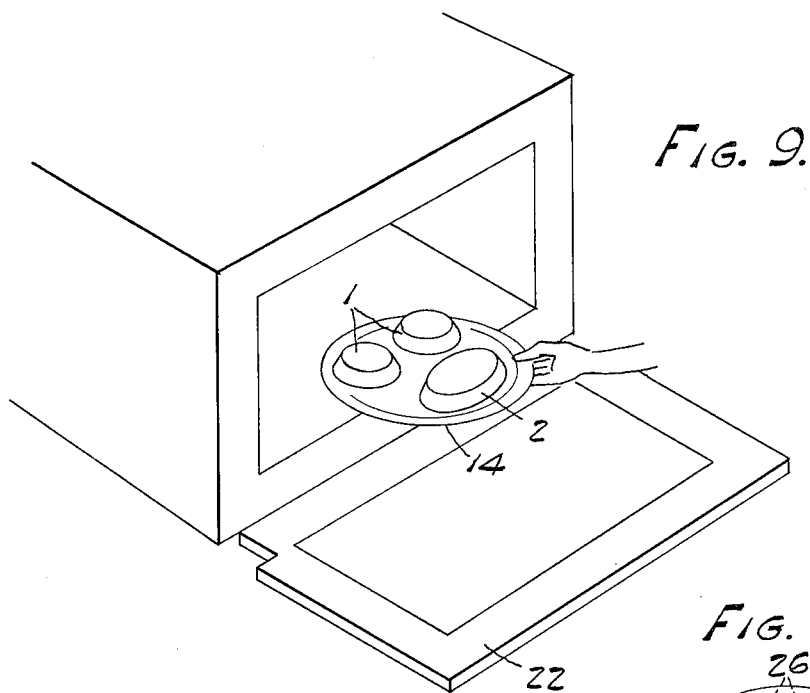
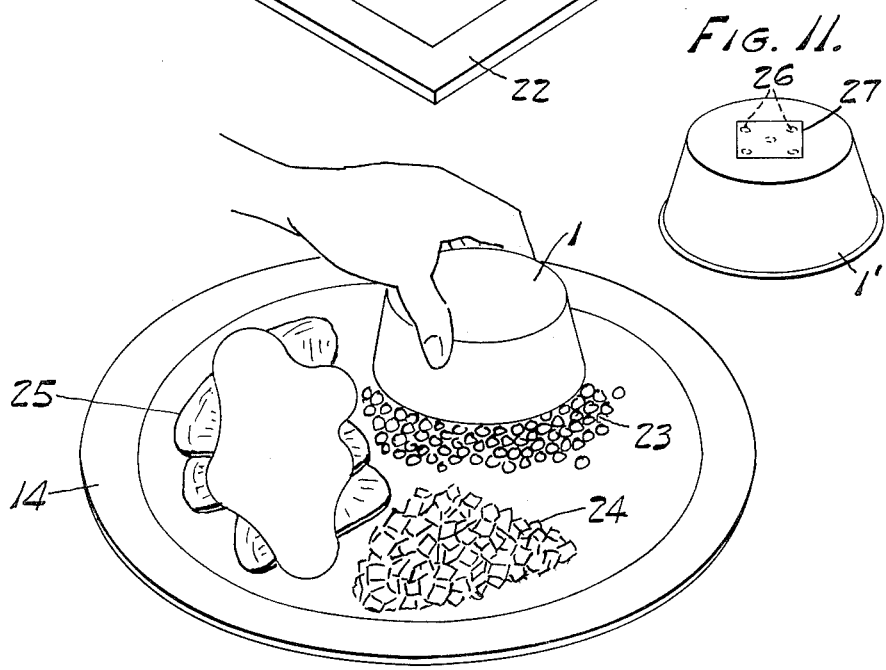

United States Patent Office 3,247,988
Patented Apr. 26, 1966

3,247,988
APPARATUS FOR SERVING PREVIOUSLY PREPARED FOOD
William W. Cease, Fredonia, N.Y., assignor to Cease Central, Inc., Dunkirk, N.Y.
Filed Aug. 30, 1962, Ser. No. 220,518
2 Claims. (Cl. 214—301)

This invention relates generally to the food handling art, and more specifically to a new and useful method of and apparatus for serving previously prepared food.

The prior preparation of food which is stored and then reheated at the time of service offers many advantages from the viewpoint of economy and convenience. However, its full potential has not been realized, because such food heretofore has looked and tasted like previously prepared and reheated food, and therefore has not been accepted by those who insist upon the taste and appearance of food freshly prepared and served.

A primary object of my invention is to provide previously prepared food, when it is served, with the taste and appearance of food which has been freshly prepared and served.

Another important object of my invention is to provide the foregoing in a manner permitting complete flexibility in the selection of food items comprising an individual meal.

Still another object of my invention is to accomplish the foregoing with previously prepared food which can be stored either in frozen or refrigerated condition.

The method of serving previously prepared food in accordance with my invention is characterized in one aspect thereof by the steps of assembling containers of individual portions of the desired food items into a serving arrangement, covering the assembled containers with an inverted service plate, inverting the service plate and containers while maintaining the same in assembled relation whereby the service plate is turned right side up and the containers are inverted on the service plate with the food confined in the containers, heating the assembled service plate and containers until the food in the latter is at the desired serving temperature, and then lifting the containers from the service plate and from the heated food thereon.

The apparatus for serving previously prepared food in accordance with my invention is characterized in one aspect thereof by the provision of a table having means on one side thereof for receiving containers of food and retaining the same in the desired serving arrangement, and means mounting the table for rotation about a normally horizontal axis to invert such containers on a service plate initially inverted thereover and held thereagainst as a cover while the table is rotated.

The foregoing and other objects, advantages and characterizing features of the method and apparatus of my invention will become clearly apparent from the ensuing detailed description thereof, taken in conjunction with the accompanying drawings wherein like reference numerals denote like parts throughout the various views and wherein:

FIG. 1 is a top perspective view of two containers for previously prepared food, for use in the method and apparatus of my invention;

FIG. 2 is a vertical sectional view through an assembly of stacked trays for storing the containers of FIG. 1;

FIG. 3 is a top perspective view of a tray of containers removed from the racks of FIG. 2;

FIG. 4 is a top perspective view of a single container, separated from adjacent containers but prior to removal of its cover;

FIG. 5 is a top perspective view of an inverting table of my invention, showing a vegetable container being placed thereon;

FIG. 6 is another top perspective view of the table of FIG. 5, with a service plate inverted over the containers thereon preparatory to inverting the assembled plate and containers;

FIG. 7 is a similar view, but with the table partially inverted;

FIG. 8 is a view thereof, with the table completely inverted and with the service plate separated therefrom;

FIG. 9 is a perspective view illustrating the insertion of the service plate with the inverted containers thereon into a heating oven;

FIG. 10 is a perspective view of the service plate with two of the containers removed, leaving the heated food thereon, and with the third container being lifted away from the service plate showing how the food in the containers flows outwardly onto the plate;

FIG. 11 is a bottom perspective view of a modified container; and

FIG. 12 is a transverse sectional view of the inverting table modified to receive a container-frame-plate assembly of my invention.

Referring now in detail to the apparatus and method of my invention, with particular reference to the accompanying drawings, the food will be prepared some time prior to serving the same, and then stored. This offers a substantial economic advantage, in that large quantities of food can be prepared and properly proportioned at one, central commissary, as distinguished from the preparation and portioning of food at the various points of service. Also, the food is stored in individual containers for each food item, making possible long production runs and resulting efficiencies and economies. My invention can be used with virtually any food item, and it is contemplated that a large selection of food items will be prepared and then stored in individual portions for future service.

Thus, after preparation of the various food items involved, individual portions are packaged in individual containers, such as the containers 1 and 2 shown in FIG. 1. These containers can be made of any suitable material, such as molded paper or plastic, capable of withstanding the temperatures required to heat the food to the desired serving temperature. Also, different containers can be made of different material, or may incorporate varying degrees of shielding, to modify the degree of energy or heat absorption, transmission or reflection. The simultaneous heating of different foods in the same oven thereby is controlled.

Each container receives an individual portion of a single food item, with the container 1 being adapted to receive, for example, a vegetable such as the peas 23 or the diced carrots 24 shown in FIG. 10, and with the oval container 2 being adapted to receive an entree, whether it be meat such as the beef slices 25 of FIG. 10 or some other main dish. Further, the containers 1 and 2 are designed and proportioned so that they can be grouped to provide one entree and two vegetables in the proper serving arrangement for a single service plate, as will be described in greater detail hereafter.

It is contemplated that the individual containers 1 and 2 will be stored with the food in either refrigerated or frozen condition. FIG. 2 illustrates a suitable storage rack, comprising for example a tray 3 having a series of openings to receive the lower ends of the containers 1 or 2. The containers 1 and 2 are of tapered side wall form, and simply slip-fit into the openings in the tray 3, with the container walls having frictional engagement with the tray. A relatively large number of containers can be carried by a single tray, the illustrated number being only by way of example, and it is contemplated that the normally open upper ends of the containers will be closed, during storage, as by a sheet 4 of plastic or other suitable material extending across several of the containers, as shown in FIGS. 2 and 3. To facilitate application of such covering the upper margins of the containers 1 and 2 may be flanged as shown in FIGS. 1 and 2 to provide a sealing surface.

The tray is fixed within a stacking frame 5 having around its upper periphery an upwardly opening, grooved perimeter 6, receiving the depending skirt 7 of a cover 8. A lower tray 3 is carried within a frame 5' having a grooved upper perimeter 6, receiving the frame 5 of the superposed tray, and also having a bottom wall 9. Alternately, where bottom wall 9 can be omitted, frame 5' can be replaced by another frame 5. Obviously several trays 3 and frames 5 can be stacked in this manner, with the tongue and groove connection between superposed frames holding the same against lateral shifting. The overhanging, laterally projecting perimeters 6 provide shoulders which can be engaged by lifting and/or lowering devices, and by hand, for moving the trays.

When it is desired to serve the food packaged in the containers 1 and 2, the desired number and selection thereof will be removed from storage. If the food is frozen, it may be thawed for the time necessary to bring its temperature to, for example, 40° F. By holding the food at a refrigerated temperature prior to service, the problems encountered in attempting to heat it from a frozen state to serving temperature, at the time of serving, are avoided. However, frozen food may be heated directly to serving temperature if desired.

Also, it is contemplated that the stacked trays and frames can be overwrapped in an inert atmosphere to safely prolong the shelf life thereof.

At the time of use, each container is separated from the containers which are connected thereto by cover sheet 4. For example, the cover sheet 4 can be simply cut away, along the separation lines 10, which can be perforated for this purpose. This leaves each container with its individual color sheet 4' as shown in FIG. 4, and this cover sheet is removed when the container is being readied for heating. If the frozen containers are stored upside down, any refrigeration failure causing temporary thawing will be evident from the presence of food on the cover.

Preparatory to heating the food items which have been requested or selected by the patron, the attendant will place the containers 1 and 2 containing the selected entree and other food items on the inverting table 11 which is arranged to receive and retain the same in the desired serving arrangement. The selected containers are positioned right side up on table 11 which, in the illustrated embodiment, is provided with two recesses 12 to receive two containers 1, and with a recess 13 which is shaped to receive the entree container 2. It will be observed that the recesses 12 and 13 are arranged to provide a grouping of the selected vegetables and entree which will fit on a service plate, and which comprises the desired serving arrangement on the plate. FIG. 5 shows a container 1 being inserted in a recess 12, it being understood that container receiving and retaining means other than recesses might be provided.

Then the actual service plate 14 itself is placed over the assembled containers 1 and 2, as a cover therefor. In other words, the three containers are assembled on the inverting table 11, and are then covered with an upside down service plate 14 which overlies table 11 and completely covers the containers grouped thereon, as shown in FIG. 6. The height of containers 1 and 2, and the depth of recesses 12 and 13, are arranged so that the open upper ends of the containers engage plate 14.

The service plates 14 may be conventional plain round plates or may be of the compartment type wherein ridges at the upper surface of the plate divide the same into compartments which in the present instance would be arranged to register with the arrangement of the several food items as determined by the inverting table 11. Plates of various other shapes and designs may be adapted for use in the present method.

The assembled service plate 14 and containers 1, 2 then are inverted, by rotating the inverting table 11 about a normally horizontal axis. To this end, table 11 is journaled for rotation about a normally horizontal axis, by pivot means 15 comprising in the illustrated embodiment a pipe or bar (FIG. 12) extending from opposite sides of table 11 and journaled in U-bolts 30 carried by the surrounding counter 16. Counter 16 is recessed, at 17, to receive table 11, and recess 17 has an inwardly offset recess 18 to accommodate the hand of the attendant when she grasps the table for inverting it, as illustrated in FIG. 6.

Table 11 is provided adjacent one segment of its circumference with a pair of brackets 19 which receive and overlie the service plate 14 in snug-fitting relation when the containers 1 and 2 are in place. Brackets 19 therefore retain that half of the plate in position over the containers, and the attendant grasps the opposite edge of service plate 14, together with the corresponding peripheral portion of table 11, for holding them together and inverting them, as shown in FIG. 7.

The table is rotated 180° until it is completely inverted, the counter 16 being provided with a stop 20 to hold the table against further rotation. In this position, service plate 14 is right side up, with the containers 1 and 2 inverted thereon, and the attendant simply removes the service plate with the inverted containers thereon from inverting table 11. This is readily accomplished by merely sliding the service plate out of brackets 19.

Table 11 then is released, and is returned to its normal position (FIG. 5), by means such as the return springs 28 shown in FIG. 12. Each spring 28 has one end secured to counter 16, and the other to pivot bar 15 which is clamped to table 11 by U-bolts 29, to rotate with the table. Inverting of table 11 thereby stresses springs 28 for subsequent return of the table.

Service plate 14 with the inverted containers 1 and 2 thereon then is inserted in a heating oven 21, which can be of any desired type and design, having a typical door 22. It is an important feature of my invention that the containers 1 and 2 are inverted on plate 14 prior to heating, and that the food portions are confined by their respective containers during heating. The inverted containers serve as covers, preventing the escape of moisture and thereby maintaining proper moisture in the food. By heating the food portions in their containers as covers, the response of the food to the ambient heat is greatly facilitated. Also, the heating of the different food items on a single plate can be individually controlled by proper selection of individual container design and materials.

When the contained food has been heated to the desired serving temperature, which normally is 150°–160° F., the service plate 14 is removed, from the oven, and the containers 1 and 2 are removed by lifting them upwardly away from the plate. When this is done, the food flows outwardly of the container, as illustrated with the peas 23 in FIG. 10.

This heating of the food portions within their containers as covers, followed by flowing onto plate 14, results in a taste and appearance closely approximating that provided by the same food freshly prepared and served in the usual manner.

Where it is desired to permit the escape of steam and thereby avoid building up pressure lifting the containers off the food, vent holes 26 are provided in the container bottom walls, as shown in the container 1' of FIG. 11. These holes are covered, as by a flexible plastic film 27 which can be heat sealed thereover. Film 27 covers during storage, and is removed by the attendant prior to heating.

FIG. 12 shows an arrangement in which the containers 31 and 32 are snap-fitted into a frame 33, and covered with an inverted service plate 34, to comprise a package. Inverting table 11 then will be provided with means, for example a groove 35, receiving and retaining the depending skirt 36 of frame 33. An upstanding shoulder 37 on frame 33 holds plate 34 against lateral shifting. The container shoulders 40 insure proper seating in the frame, and the container detents 39 hold the containers in the frame.

In use, the selected containers 31 and 32 are assembled into frame 33, and plate 34 is inverted thereover. Frame 33 is placed on table 11 which is inverted, as previously described with reference to FIGS. 5–7. The plate 34 then is removed, as in FIG. 8, but with the inverted frame 33 engaging the inverted containers. The plate, containers and frame are placed in the oven, as before, and frame 33 acts as a weight to hold containers 31 and 32 on plate 34.

When the food is at serving temperature, plate 34 is removed from the oven, and frame 33 is lifted, by its handles 38, carrying with it the containers 31 and 32. The containers then are separated from the frame, by snapping the container detents 39 past the frame.

Accordingly, it is seen that my invention fully accomplishes its intended objects. While I have disclosed herein only one detailed embodiment of my invention, that has been done by way of illustration only, without thought of limitation.

The containers 1 and 2 can be discarded after use, or they can be retained and reused. Also, they can be used with food items which are not originally packaged therein, by placing such items within the containers and then proceeding as shown in FIGS. 5–10.

Having fully disclosed and completely described my invention, and its mode of operation, what I claim as new is:

1. Apparatus for use in serving previously prepared food comprising a support, a table member having recesses in one side thereof for receiving open containers of food in upright condition, said recesses being spaced in the desired arrangement of the food of said containers on a service plate, an inverted service plate positioned over said open containers, means connecting said table to said support for rotation on a horizontal axis substantially centrally through said table to reverse the same and invert the containers to deposit the contents of the containers on said service plate in said desired arrangement.

2. Apparatus for use in serving previously prepared food comprising a support, a table member having recesses in one side thereof for receiving open containers of food in upright condition, said recesses being spaced in the desired arrangement of the food of said containers on a service plate, an inverted service plate positioned over said open containers, means connecting said table to said support for rotation on a horizontal axis substantially centrally through said table to reverse the same and invert the containers to deposit the contents of the containers on said service plate in said desired arrangement, and releasable means for retaining said service plate against said containers as a cover therefor during rotation of said table member.

References Cited by the Examiner

UNITED STATES PATENTS

| | | | |
|---|---|---|---|
| 932,931 | 8/1909 | Willmann | 141—106 |
| 1,009,413 | 11/1911 | Herisse | 214—301 X |
| 1,087,909 | 2/1914 | Culley | 214—314 X |
| 1,560,028 | 11/1925 | Doyle | 214—301 |
| 1,814,680 | 7/1931 | Ford | 214—301 X |
| 2,001,045 | 5/1935 | Weiss | 214—301 X |
| 2,631,939 | 3/1953 | Peters | 99—171 |
| 2,665,806 | 1/1954 | Budd | 206—65 |
| 2,745,752 | 5/1956 | Peters | 99—180 X |
| 2,750,294 | 6/1956 | Peters | 99—171 |
| 2,767,744 | 10/1956 | Beerman | 141—319 |
| 2,895,599 | 7/1959 | Moyer et al. | 206—65 X |

GERALD M. FORLENZA, *Primary Examiner.*

HYMAN LORD, HUGO O. SCHULZ, *Examiners.*